March 6, 1962 K. MONTOR 3,024,310
MULTI-STATION INTERCOMMUNICATION SYSTEM
Filed Oct. 27, 1958

INVENTOR.
KAREL MONTOR
BY
Moses, Nolte, & Nolte
ATTORNEYS 3,024,310
MULTI-STATION INTERCOMMUNICATION SYSTEM Karel Montor, 19 Candlewood Court, Colonia, N.J., assignor of twenty percent to Albert C. Nolte, Jr., New York, N.Y.

Filed Oct. 27, 1958, Ser. No. 769,816
14 Claims. (Cl. 179—1)

Figures 1, 2:
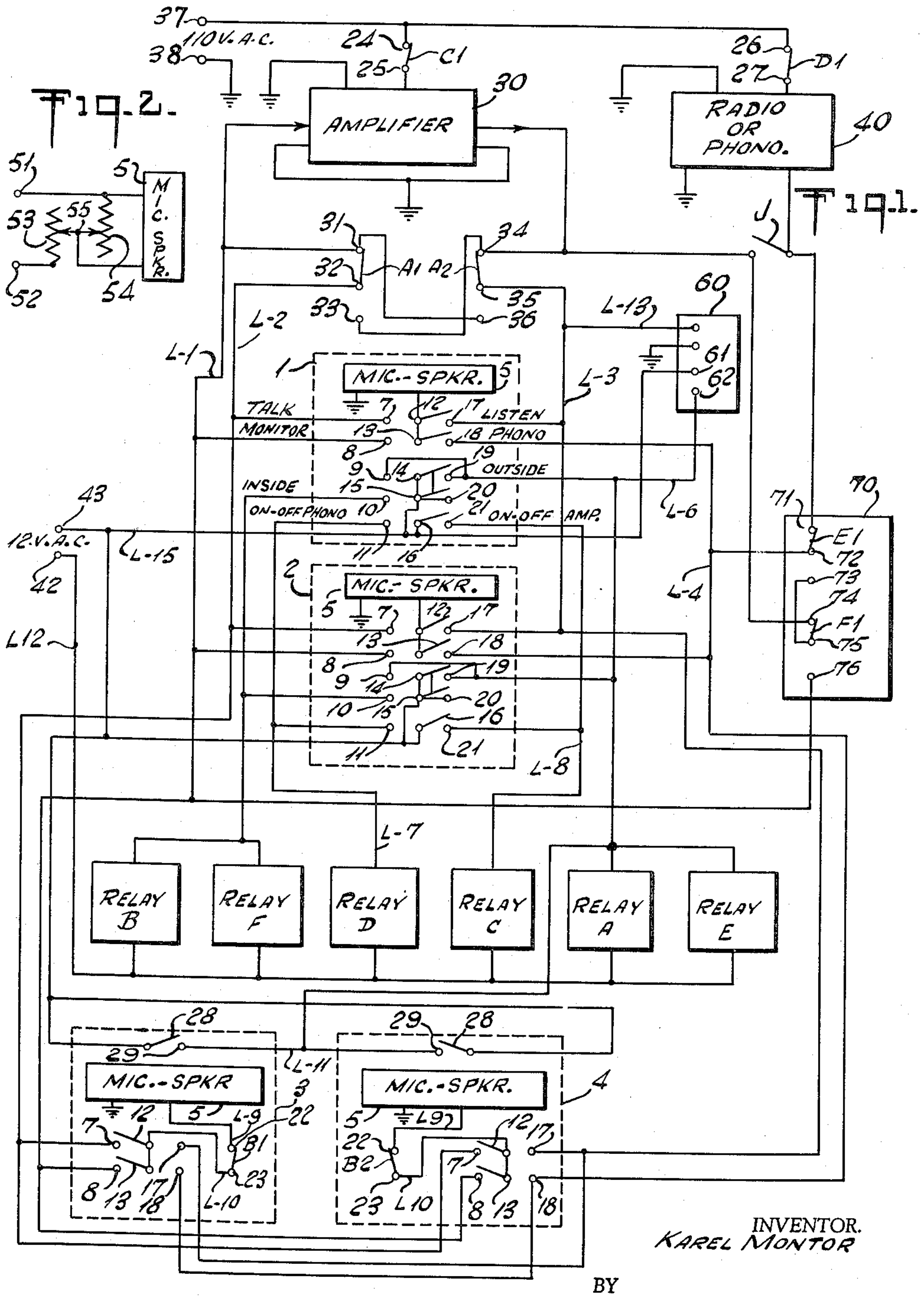

The present invention relates to an intercommunication system comprising a plurality of stations, each of which can call and carry on two-way communication with all other stations.

The system according to the invention utilizes a single amplifier common to all stations. Switching is accomplished with a minimum number of relays. The stations are extremely simple consisting essentially of several switches and a microphone-loudspeaker which, as is well known, may be a single loudspeaker used for both receiving and transmitting. The stationary switch contacts of the several stations are all connected in parallel so that the number of stations can be increased indefinitely without any re-arrangement of the system and without increasing the number of trunking lines required. Another important feature of the invention is that no operations are required at the called station, but, on the other hand, the switching from the "talk" to the "listen" positions at the called as well as the calling stations can be controlled entirely by the calling station.

Still another important feature of the invention is that any station can be put in a "monitor" condition enabling any of the other stations to permanently listen to or monitor the first-mentioned station, and this may be accomplished without interrupting the capability of the system for intercommunication between non-monitored stations. This type of operation is highly useful for electronic "baby-sitting."

Another feature of the system is that it provides outside stations which may be used at the front and rear doors of a home, which stations can communicate with stations inside the home and be disconnected under control of the inside stations when it is desirable to prevent listening at the outside stations to conversations within the home.

Other objects and advantages of the invention will become apparent from the following description and the drawing in which:

FIG. 1 is a schematic circuit diagram of an intercommunication system according to the invention; and FIG. 2 is a diagram of a volume control which may be used with the microphone loudspeakers.

Intercommunication systems are used in homes, offices, hospitals, factories, and numerous other places. Frequently, a large number of stations is required, but most systems of this type have the very serious disadvantage that the complexity of the system increases enormously when the number of stations is increased beyond a small number. A particular merit of the present system is that the complexity of the system does not increase fundamentally when more stations are added, for the stations are connected in parallel and theoretically, at least, any number of stations could be connected to a single trunk line without altering the capacity or number of conductors required in the trunk line. For simplicity of illustration and explanation of the invention, however, it will be described as having only four stations, two being inside stations and two outside stations. Another disadvantage of the intercommunication systems having a large number of stations is, in many cases, that a called person must be located at a particular station by trying one station after another. The present system overcomes this disadvantage by placing the call on all stations simultaneously and the called person need merely answer and is not required to perform any manual operations at all during the conversation. The called persons, accordingly, need not be burdened in any way with the operation of the intercommunication system.

Referring to the drawing, particularly FIG. 1, there are shown four stations 1, 2, 3 and 4. Stations 1 and 2 are considered indoor stations which may be in different rooms of the house and stations 3 and 4 may be located at the front and rear doors of the house. Each station includes a microphone-loudspeaker 5 which as well known in the art may simply be a single loudspeaker serving both as a microphone and a loudspeaker. This is common practice in the intercommunication system art. Hence, it is generally adopted for purposes of convenience and economy, but it will be understood that any equivalent arrangement may be used. Each of the four stations also includes switching means for controlling the various operations of the system. Operation is effected by manually operated switches 12 to 16 having left contacts 7 to 11 and right contacts 17 to 21. The switches 12 to 16 are double-throw switches and all of them may have a center "off" position. Switches 14 to 16 are of the type which automatically return to their center positions.

The outside stations 3 and 4 located outside the house, say at the front door and the rear door, consist of a microphone-speaker 5 and switches 12 and 13 similar to the corresponding switches of the indoor stations and having left contacts 7 and 8 and right contacts 17 and 18 similar to the indoor stations. In addition, each outdoor station is provided with a pair of contacts 22 and 23 adapted to be opened or closed by a relay contactor B1 and B2 for connecting or removing loudspeakers 5 from the system. The outdoor stations are also provided with a switch 28 operated in a manner to be described later, for enabling an outside party to talk to those in the house without any operations being performed at the inside stations. Only switch 28 and the loudspeaker 5 need be outside the house, and the remainder of stations 3 and 4 may be just inside the door.

The system also includes a single amplifier 30 which serves all stations. Connections between the amplifier and the several stations are controlled by relay A having contacts 31 to 36 and relay contactors A1 and A2. The contactors A1 and A2 are normally in the "up" position connecting terminals 31 and 32 and terminals 34 and 35. When relay A is operated contactors A1 and A2 are closed in their "down" position connecting terminal 32 to terminal 33 and terminal 35 to terminal 36, thereby reversing the connections between lines L–2 and L–3 and the input and the output of amplifier 30. Relay A, as well as other relays which will be described later, is energized preferably from a 12 volt alternating current source having terminals 42 and 43. It will be understood that this voltage may be supplied from the regular 110 volt line by a transformer. Of course, any other voltage source, either A.C. or D.C. can be used, depending on availability. Terminal 42 is connected to one side of relay A by line L–12. The other side of relay A is connected by line L–6 to terminal 19 of each indoor station, and to terminals 29 of each outdoor station by the line L–11. Terminal 43 of the 12 volt source is connected by line L–15 to switch 14 of each indoor station and switch 28 of each outdoor station so that by closing switches 14 and 28 relay A can be operated to change over the connection of the stations from the input to the output of amplifier 30 and vice versa.

Terminal 42 of the 12 volt source is also connected to relay B by line L–12. The other side of relay B is only connected to terminal 10 of indoor stations 1 and 2. Terminal 43 of the 12 volt source is connected by line L–15 to switch 14–15 so that closing switch 14–15 on terminal 10 operates relay B. Upon the operation of relay B the normally closed contacts B1 and B2 open and disconnect terminals 22 and 23 and remove loudspeakers 5 of outdoor stations 3 and 4 from the system, thus, giving the indoor stations privacy.

Line L–12 also connects terminal 42 of the 12 volt source to relay C. Relay C is of the latching type which alternately opens and closes upon successive energizations. The other side of relay C is connected only to terminals 21 of indoor stations 1 and 2. Relay C operates a contactor C1 for opening or closing the connection between terminals 24 and 25 in order to connect the 110 volt power source at terminals 37 and 38 to the amplifier 30. If desired a simple on-off switch may be provided on the amplifier for opening and closing the power circuit. In that event, the relay C may be connected and used in the same manner as the relay D, which will be described hereinafter, for the purpose of connecting another radio or source of entertainment, similar to the radio or phonograph 40, to connect to the line L–4.

Still another latching relay D is connected by line L–12 to terminal 42. The other side of relay D is connected only to terminal 11 of each indoor station by line L–7. Terminal 43 of the 12 volt source is connected to switch 16 of stations 1 and 2 so that throwing switch 16 to terminal 11 operates relay D. Switch 16 must be of the type which automatically returns to its center position. Upon operation of relay D relay contactor D1 connects terminals 26 and 27, thereby energizing a radio or phonograph 40 connected to line L–4. Line L–4 extends to terminal 18 of each station so that each station may provide itself with a radio or phonograph program by closing switch 13 on contact 18. Line L–4 is preferably shielded in order to prevent excessive pick-up and maintain the entertainment program at a high quality. If desired, line L–4 instead of extending to the phonograph or amplifier 40 could be connected at J to terminal 34 and thus to the output of amplifier 30 in order to provide each station with an optional permanent or private listening connection.

The loudspeaker of stations 1 and 2 may be connected to its input terminals 51 and 52 through an L-pad volume control device which may consist of a pair of potentiometers or variable resistors 53 and 54 and movable contact 55 which moves on both resistors 53 and 54 in unison but in opposite directions so that the total resistance connected across the terminals 51 and 52 remains nearly constant but the series and shunt resistances connected to the loudspeaker are varied as the contact 55 is adjusted.

Line L–3 may be connected to an outside plug 60, having also a ground connection, so that a loudspeaker at end of a long line can be plugged-in and connected to the output of the amplifier by line L–13. Thus "baby-sitting" or monitoring can be done at a remote point such as a neighbor's house. Lines L–6 and L–15 extend to terminal 61 and 62 to permit the remote station connected to plug 60 to control relay A to talk back to house stations, or to a monitored station in which switch 12 is on contact 7.

The operation of the system will probably be apparent to those skilled in the art from the above description of the system. It will also be understood that various types of operation are possible, but for the sake of simplicity only one method of operation will be described below. Normally switch 12 of all stations will be thrown to contact position 7, which may be labeled the "talk" contact or position, and extends through terminal 32, contactor A1 and contact 31 to the input of amplifier 30. The output of amplifier 30 is connected via contacts 34 and 35, A2 and line L–3 to contact 17. When a station wants to contact another station switch 12 is thrown to position 17. Switch 14—15 is then thrown to the left, say, that is to the position of the contacts 9 and 10, or to contacts 19 and 20. Contacts 9 and 19 being connected by line L–6 to relay A thereupon cause operation of this relay. Operation of relay A causes contactors A1 and A2 to close connections between contacts 32 and 33 on one side and contacts 35 and 36 on the other side. This causes contacts 7 and line L–2 to be switched from the input to the output of amplifier 30 and causes contacts 17 and line L–3 to be switched from the output to the input of the amplifier. Hence, the station, say station 1 in which the switches are being operated connects itself via contact 17 to the input of the amplifier and connects all other stations via contact 7 to the output of the amplifier. Station 1 may then talk to all other stations. If switch 14—15 has been thrown to the left, that is, the contacts 9 and 10 then in addition to operating relay A, relay B has also been operated via line L–5 and this causes the opening of contactors B1 and B2 and disconnection of the outside stations 3 and 4, so that communication is had only with the indoor stations. Of course, if it is desired to answer the front door or the rear door stations 3 and 4 then switch 14—15 is thrown to the right and conversation can then be conducted with the outside stations. Switch 14—15 is arranged to automatically return to the center position. After station 1 has called then and desires to listen for the answer of station 2, station 1 permits switch 14—15 to return to its center position, thus operating relay A to its normal position and restoring station 2 and all other stations to the "talk" condition while station 1, having switch 12 on contact 17 is in the listen position. Thus, the entire conversation can be controlled by the "calling" station and the "called" station need perform no operations whatever.

A selected station can be put in a permanent "monitor" position so that whatever is happening, say in the room of station 1, can be monitored by any other station, as is desired, for example, where a baby is asleep in a certain room and the station is being used to determine when the baby awakes or something happens requiring attention. To serve this function station 1 throws switch 13 to "monitor" position 8, which permanently connects microphone-speaker 5 of that station to line L–1 and the input of amplifier 30. Any other station then, by throwing switch 12 to position 17 can monitor station 1. Since the monitored station is permanently connected only to the input of the amplifier no messages can be fed into the room which is being monitored and the remainder of the system can therefore be used in a normal way without disturbing the monitored room.

If the person in any room or at any station desires to listen to a radio or phonograph program he may do so by throwing switch 16 to position 11, thereby operating relay D through line L–7 to place the radio or phonograph 40 in operating condition. Then by throwing the switch 13 to position 18 the loudspeaker 5 of that station is connected to the line L–4 to the output of the radio or phonograph 40. If remote on-off control of amplifier 30 and radio or phonograph 40 is dispensed with by using on-off switches on these units, then relays C and D, switch 16 and lines L–7 and L–8 can be eliminated, leaving a simple system.

When an outside station desires to speak to an inside station switch 12 is thrown to position 17 and switch 28 is operated. The operation of the latter switch connects relay A to line L–11 and terminal 29 to terminal 43 of the 12 volt source and causes operation of relay A. The operation of relay A as previously described causes relay A to reverse the connection to amplifier 30 so that contact 17 is connected to the input of the amplifier while the contacts 7 of the other stations, for example, the indoor stations are connected to the output of the amplifier. The outdoor station may then talk to the indoor station. By opening switch 28 the outdoor station may place itself in the listen position and re-connect the inside station to the talk position. In this way a conversation can be managed at the outside station in a manner similar to that which has already been described with respect to the inside stations.

If it is desired to provide for contacting a station listening to music, i.e., to radio or phonograph 40, a unit 70 may be provided comprising relays E and F. These relays have their windings connected in parallel with those of relays A and B respectively. Alternatively, instead of relays E and F, relay A may be provided with additional contacts 71, 72 and 73 and relay B with contacts 74, 75 and 76. With this arrangement a station listening to radio or phonograph 40, i.e., having switch 13 on contact 18 may be called by throwing switches 12 and 14—15 to the right. This causes relays A and E to operate so that the connection from contact 18 to 72 is switched by contactor E1 from contact 71 to contact 73 and from there through contact 75, contactor F1 and contact 74 to the output of the amplifier. This operation will be performed with respect to all stations which were connected to radio or phonograph 40. When, next, the calling station desires to hear the called station switches 12, 14 and 15 are thrown to the left and this causes relays A, E, B and F to operate. Contactor F1 then connects terminal 75 to terminal 76 and line L–1, so that the called station is connected to the input of the amplifier and may talk to the calling station, which is then connected to the output of the amplifier.

Relay D may have two sets of contacts such that one set is closed when the other is open, and vice versa. Then each set of contacts may control the operation of a different radio or phonograph 40, so that one or the other may be selected by operating relay D to one position or the other by means of switch 16.

A station can both listen to the radio or phonograph 40 and monitor other stations at the same time by throwing switches 12 and 13 to terminals 17 and 18.

It will be apparent that many variations and modifications of the system disclosed herein can be made without departing from the teachings of the invention. Such changes may be dictated in some instances by the flexibility or capabilities of the system desired in particular installations, as already pointed out in several respects. Many other variations will be apparent to those skilled in the art. Hence the invention is not to be construed as limited except as defined in the following claims.

What is claimed is:

1. An intercommunication system comprising a plurality of stations and an amplifier common to all of said stations, each station including speech receiving and transmitting means, a plurality of switches in each station, a plurality of conductors connecting said stations in parallel, one switch contact of each station being a talk contact connected by one of said conductors normally to the input of the amplifier and another switch contact being a listen contact normally connected to the output of the amplifier, one of said switches being a double-throw switch connecting the speech receiving and transmitting means to either the talk contact or the listen contact, and relay means connected and controlled by another of said switches for reversing the connections of the talk and listen contacts with the input and output of the amplifier for reversing the connections of all stations with respect to the input and output of the amplifier.

2. A system according to claim 1, including a source of audio frequency electrical signals, said stations including means for connecting said speech receiving and transmitting means to said audio frequency source, and control means for enabling one station to disconnect all stations connected to the audio frequency source and connect said stations to said amplifier.

3. A system according to claim 2, wherein said control means includes means for connecting said last mentioned stations selectively to the input or the output of the amplifier.

4. A system according to claim 1, wherein one of said switches at each station is connected directly between the input of the amplifier and the speech receiving and transmitting means.

5. An intercommunication system comprising a plurality of stations and an amplifier common to all of said stations, each station including speech receiving and transmitting means, a plurality of switches in each station, the switches of one station being substantially identical with the switches of another station, a plurality of conductors each connected to like switch contacts of the several stations for connecting said stations in parallel, one of said switch contacts of each station being a talk contact connected by one of said conductors normally to the input of the amplifier and another of said switch contacts being a listen contact normally connected by another of said conductors to the output of the amplifier, one of said switches being a double-throw switch connecting the speech receiving and transmitting means to either the talk contact or the listen contact, and relay means connected to and controlled by a second of said switches for reversing the connections of said talk and listen contacts with the input and output of the amplifier for reversing the connections of all stations with respect to the input and output of the amplifier.

6. An intercommunication system comprising a plurality of stations and an amplifier common to all of said stations, each station including a microphone-loudspeaker, a plurality of conductors connecting said stations in parallel, each station having a talk contact connected by one of said conductors normally to the input of the amplifier and a listen contact normally connected to the output of the amplifier, each station including switch means for connecting the microphone loudspeaker to either the talk contact or the listen contact, and means for reversing the connections between the talk and listen contacts and the input and output of the amplifier for reversing the connections of all stations with respect to the input and output of the amplifier.

7. A system according to claim 6, including a source of audio frequency electrical signals, said stations including means for connecting said microphone loudspeaker to said audio frequency source, and control means for enabling one station to disconnect all stations connected to the audio frequency source and connect said stations to said amplifier.

8. A system according to claim 7, wherein said control means includes means for connecting said last mentioned stations selectively to the input or the output of the amplifier.

9. A system according to claim 6, including a source of audio frequency electrical signals, and means including a switch for connecting the audio frequency source to the microphone-loudspeakers when the latter are connected by said switch means to the listen contacts.

10. An intercommunication system comprising a plurality of first stations and at least one second station, an amplifier having an input and an output common to all said stations, each of said stations including a speech receiving and transmitting means and a plurality of manually operated switch means for connecting said speech receiving and transmitting means to a talk contact or a listen contact, a first conductor normally connecting the talk contacts of all said stations in parallel to the input of the amplifier and a second conductor normally connecting the listen contacts of all said stations to the output of the amplifier, relay means for reversing the connections between the first and second conductors and the input and output of the amplifier, a second switch in each of said stations connected to said first relay for operating said relay to reverse the connections between the first and second conductors and the amplifier, a second relay having means for disconnecting the speech receiving and transmitting means of the second stations, said switches including switch means connected to the second relay for operating the second relay for enabling the second station to be disabled during communication between the first stations.

11. An intercommunication system comprising a plurality of first stations and at least one second station connected in parallel, an amplifier having an input and an output common to all said stations, each of said stations including speech receiving and transmitting means and a plurality of manually operated switch means including a double-throw switch for connecting said speech receiving and transmitting means to a talk contact or a listen contact, a first conductor normally connecting the talk contacts of all said stations in parallel to the input of the amplifier and a second conductor normally connecting the listen contacts of all said stations to the output of the amplifier, relay means for reversing the connections between the first and second conductors and the input and output of the amplifier, said switches at each of said first stations further including a second switch for connecting the speech receiving and transmitting means directly to the input of the amplifier, and a third switch in each of said first stations connected to said first relay for operating said relay to reverse the connections between the first and second conductors and the amplifier, a second relay having means for disconnecting the speech receiving and transmitting means of the second station, said third switch including means connected to the second relay for operating the second relay for enabling the second station to be disabled during communication between the first stations.

12. An intercommunication system comprising a plurality of first stations and at least one second station, an amplifier having an input and an output common to all said stations, each of said stations including a speech receiving and transmitting means and a plurality of manually operated switch means including a double-throw switch for connecting said speech receiving and transmitting means to a talk contact or a listen contact, a first conductor normally connecting the talk contacts of all said stations in parallel to the input of the amplifier and a second conductor normally connecting the listen contacts of all said stations to the output of the amplifier, relay means for reversing the connections between the first and second conductors and the input and output of the amplifier, said switches at each of said first stations further including a second switch for connecting the speech receiving and transmitting means directly to the input of the amplifier, and a third switch in each of said first stations connected to said first relay for operating said relay to reverse the connections between the first and second conductors and the amplifier, a second relay having means for disconnecting the speech receiving and transmitting means of the second station, said third switch including means connected to the second relay for operating the second relay and the first relay simultaneously for enabling the second station to be disable during communication between the first stations.

13. A system according to claim 12, including a source of audio frequency electrical signals, said stations including means for connecting said speech receiving and transmitting means to said audio frequency source, and control means for enabling one station to disconnect all stations connected to the audio frequency source and connect said stations to the said amplifier.

14. A system according to claim 13, wherein said control means includes means for connecting said last mentioned stations selectively to the input or the output of the amplifier.

References Cited in the file of this patent

UNITED STATES PATENTS

| | | |
|---|---|---|
| 2,249,456 | Campbell | July 15, 1941 |
| 2,496,398 | Lambert | Feb. 7, 1950 |
| 2,523,671 | Vincent | Sept. 26, 1950 |
| 2,529,912 | Campbell | Nov. 14, 1950 |
| 2,567,484 | Ivens | Sept. 11, 1951 |
| 2,606,976 | Campbell | Aug. 12, 1952 |